Sept. 8, 1959 M. J. McCANN 2,903,511

FACSIMILE TRANSMITTER BLANKING SYSTEM

Filed Jan. 18, 1954 3 Sheets-Sheet 1

INVENTOR.
M. J. McCANN

BY Edward R. Hyde Jr

ATTORNEY

Sept. 8, 1959 M. J. McCANN 2,903,511
FACSIMILE TRANSMITTER BLANKING SYSTEM
Filed Jan. 18, 1954 3 Sheets-Sheet 2

INVENTOR.
M. J. McCANN
BY Edward R. Hyde Jr.
ATTORNEY

INVENTOR.
M. J. McCANN
BY Edward R. Hyde Jr.
ATTORNEY

United States Patent Office 2,903,511

Patented Sept. 8, 1959

2,903,511

FACSIMILE TRANSMITTER BLANKING SYSTEM

Marshall J. McCann, Long Beach, Calif., assignor to The Western Union Telegraph Company, New York, N.Y., a corporation of New York Application January 18, 1954, Serial No. 404,581

5 Claims. (Cl. 178—7.1)

This invention relates to facsimile apparatus and more particularly to a blanking system for selectively preventing transmission of facsimile message signals.

A conventional type facsimile transmitter comprises a rotatable drum around which a message copy is wrapped. A scanning beam produced by a light source is caused to traverse the rotatable drum whereby the beam is modulated in accordance with the message copy. A light responsive means converts the modulated light beam into electrical impulses for transmission. The message copy is mounted on the rotatable drum with an underlap area within which mounting means for the message copy is generally located. During each revolution of the drum the underlap area will be scanned by the light beam which will be modulated by the mounting means or other markings in this area. This will produce undesirable markings upon the copy at the receiving station.

It is therefore an object of this invention to provide means whereby transmission of picture signals is prevented during the scanning of the underlap area in each revolution of the drum.

It is a further object of the present invention to provide a blanking system that is adjustable so that the blanking interval may be varied or preset in accordance with the width of the message copy.

A further object of this invention is to provide a blanking system that is fast and accurate in response and therefore particularly adaptable for employment with a high speed facsimile transmitter.

Another object is to provide for the transmission of a distinctive blanking signal during the blanking period of each revolution of the drum.

In accordance with the above objects a multivibrator is provided which in one condition permits transmission of intelligence signals and in a second condition prevents transmission thereof. The multivibrator is selectively controlled by two pickup coils. One coil has associated therewith a magnet which rotates in synchronization with the transmitting drum and which produces a pulse in its associated coil to initiate the blanking condition of the multivibrator. This magnet bears a fixed relation to one edge of the message copy as it is mounted on the drum. A second coil has associated therewith a second rotatable magnet which periodically produces a pulse to reverse the condition of the multivibrator to extinguish blanking. The magnet associated with the second coil is adjustable so that it may be preset in accordance with the other edge of the message copy. The invention will be understood from the following description taken in view of the drawings in which—

Figure 1:
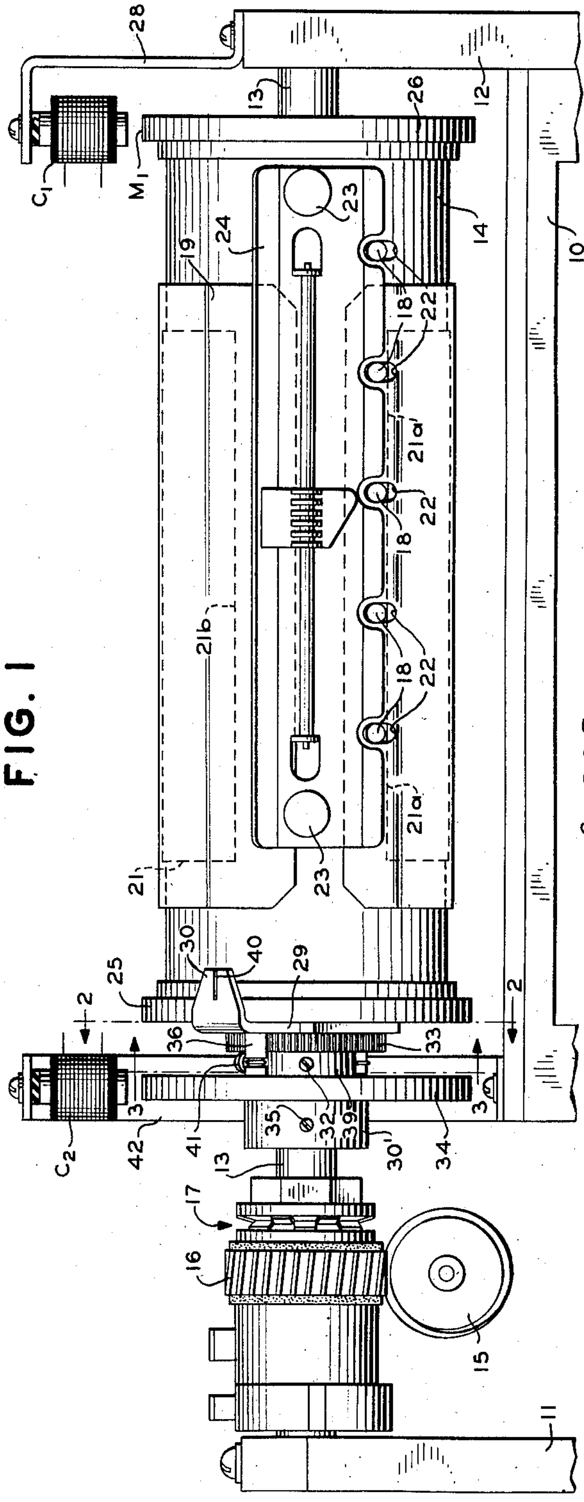
Fig. 1 is a front view of a facsimile transmitter.

Referring now to Fig. 1, a base 10 supports bearing members 11 and 12 which mount shaft 13. A rotatable drum 14 is mounted on the shaft by any suitable means to rotate therewith. Shaft 13 is driven through a worm 15, worm gear 16 and clutch mechanism 17 by a driving means not shown.

Figures 2, 3:
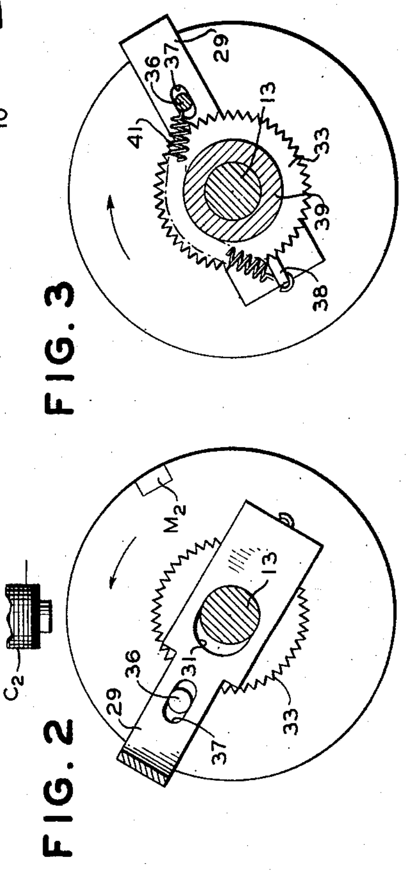
Fig. 2 is a section taken on the line 2—2 of Fig. 1.
Fig. 3 is a section taken on the line 3—3 of Fig. 1.

Located longitudinally on drum 14 are studs 18. A flexible transparent wrapper 19 holds the message copy 21 against the outer surface of the drum. The transparent wrapper is provided with a series of holes 22 that are received by the studs 18. A fastener strip 24 is mounted on the drum by means of studs 23 to hold the wrapper against the drum. Reference is made to the copending application of Robert D. Parrott, Serial No. 337,625, filed February 18, 1953, and assigned to the assignee of the present application, for the details of the wrapper mounting mechanism. Drum 14 has two end pieces 25 and 26 of non-magnetic material secured at each end thereof. A permanent magnet M1 is inserted in the periphery of end piece 26. A bracket 28 mounted to the frame supports coil C1 in such a position that the magnetic flux of magnet M1 will cut the coil with each rotation of the drum. This action develops a voltage in coil C1 to control a multivibrator at the beginning of a blanking period as will become apparent hereinafter. Located at the other end of the rotating drum adjacent end disc 25 is a blanking pointer 29 with an elongated hole 31 therein whereby the blanking pointer is loosely mounted on shaft 13. A serrated detent wheel 33 having a hub 39 is secured by a set screw 32 to the shaft. The wheel 33 is located on the shaft a sufficient distance from disc 25 as to permit the blanking pointer to be freely rotated. A disc 34 is loosely mounted on shaft 13 and held in place by means of a collar 30 secured by means of a set screw 35 to shaft 13. A pin 36 is secured to the inner face of disc 34 and extends parallel to the shaft to be received by an elongated hole 37 in the blanking pointer as shown in Fig. 2. The outer end of the blanking pointer is bent forwardly as at 30 and is marked as at 40 for a purpose to be hereinafter described. The other end of the blanking pointer has secured thereto a wedge-shaped lug 38 (Fig. 3) which engages with gear 33. A tension spring 41 is secured at one end to the wedge-shaped lug and at the other end to pin 36 passing around the hub 39 of the gear. It is seen, therefore, that spring 41 normally urges the blanking pointer radially outward whereby lug 38 is engaged by serrated detent wheel 33. With the lug so engaged, rotation of the shaft and wheel will cause blanking pointer 29 to rotate. This rotary motion will be transferred to disc 34 by pin 36 which mechanically links the pointer and disc as shown. A magnet M2 is inserted in a section of the disc on the periphery thereof. A coil C2 is mounted by means of a bracket 42 so as to be cut by the flux from magnet M2 at each rotation of the drum. As will be apparent hereafter, the voltage developed in the coil C2 by magnet M2 controls a multivibrator to end the blanking period.

In mounting a message sheet on the drum, the flexible wrapper 19 is opened to permit the sheet to be slid thereunder to a point where the trailing edge 21*a* of the message sheet is located against studs 22. This is a fixed position, always assumed by one edge of a message sheet regardless of the size of the sheet. The leading edge 21*b* of the message sheet assumes a position on the drum depending upon the width of the said sheet.

Figure 4:
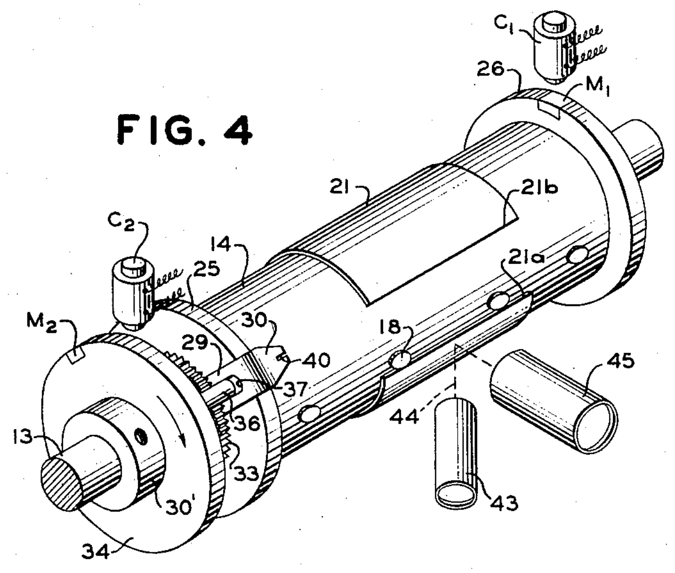
Fig. 4 is a diagrammatic representation showing the relative positions of the pickup coils, their associated magnets and the message copy at the beginning of a blanking period.

Referring now to Fig. 4, a light source 43 produces a scanning beam 44 which is reflected into photocell 45. As therein shown, the underlap area is just entering the scanning position. The magnet M1 at this time is at a position where it is developing a voltage pulse in the coil C1 to start the blanking period. Since the trailing edge 21*a* of a message sheet is in every case located along the line of studs 18, magnet M1 is at a fixed position in the drum disc 26. The angular distance between the trailing edge 21*a* of the message copy and the magnet M1 is equal to the angular distance between the scanning beam 44 and coil C1.

Disc 34, serrated detent wheel 33 and blanking pointer 29 are assembled so that the angular distance between magnet M2 and the marker 40 is equal to the angular distance between the scanning beam 44 and coil C2. After a message sheet is mounted on a drum, the adjustable magnet M2 is positioned by manually depressing the blanking pointer radially inward and rotating the pointer to a point where marker 40 is aligned with the leading edge 21*b* of a message sheet. This setting of the pointer will set the magnet M2 at an angle with respect to magnet M1 which is equal to the underlap area of the message sheet.

Figure 5:
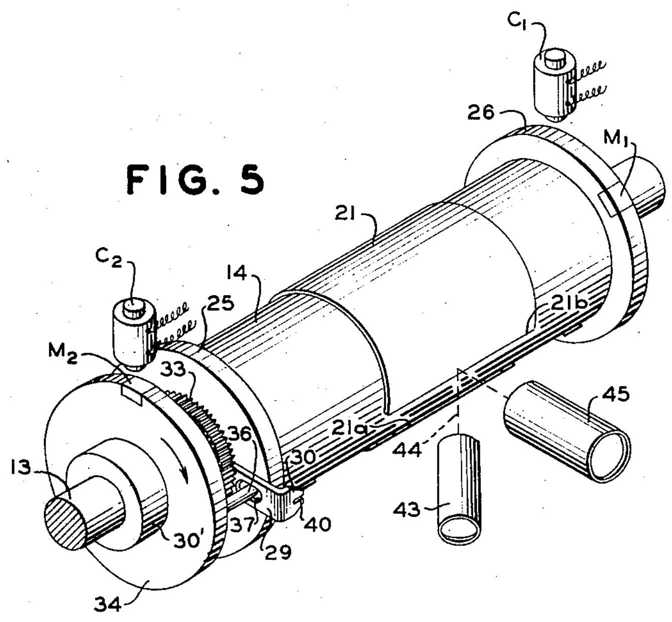
Fig. 5 is a diagrammatic representation similar to Fig. 4 but showing the position of the transmitter at the end of a blanking period.

Fig. 5 is similar to Fig. 4 and shows the position of magnet M2 as the leading edge 21*b* of a message sheet is entering a scanning area. At this position blanking of transmission will end and the transmitter will be conditioned to permit transmission of message signals.

Figure 6:
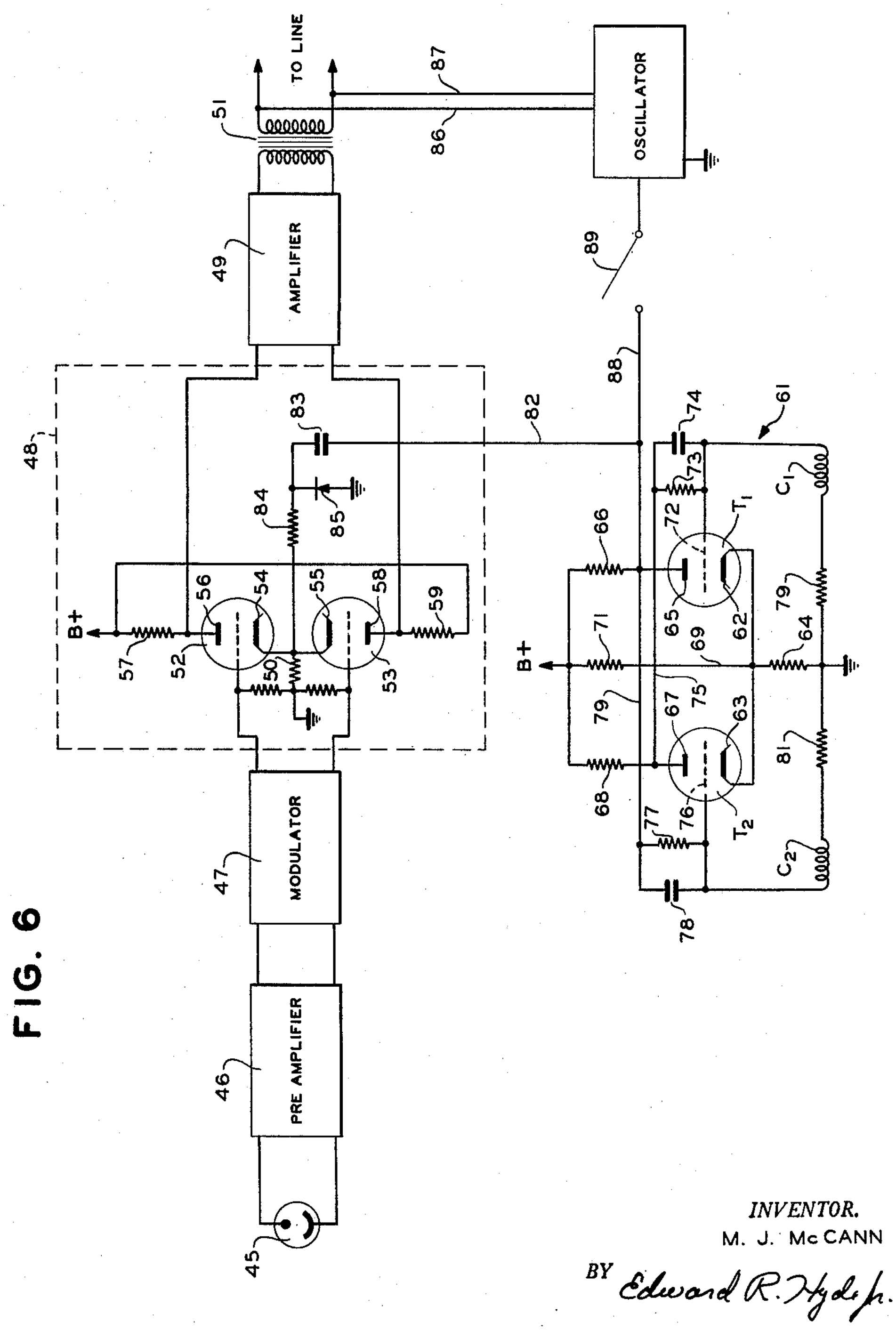
Fig. 6 is a schematic diagram disclosing the blanking circuit of the present invention.

Referring now to Fig. 6, the output of photocell 45 is coupled to a preamplifier 46 wherein the signal is amplified and coupled to a modulator 47 to modulate a carrier signal. The output of modulator 47 is sent through two stages 48 and 49 of amplification and coupled to the line through output transformer 51. Amplifying stage 48 comprises two electron discharge tubes 52 and 53 coupled in push-pull arrangement. The cathodes 54 and 55 are joined together and coupled to ground through resistor 50. Plate 56 of tube 52 is supplied with a positive potential through resistor 57, and plate 58 of tube 53 is likewise supplied with positive potential through resistor 59. Blanking is effected by selectively applying a positive potential to the cathodes 54 and 55 so as to bias tubes 52 and 53 beyond cut-off. In the cut-off condition amplifying stage 48 will of course prevent transmission of any signals to the line. This cut-off condition is accomplished by means of a multivibrator generally indicated by numeral 61. The latter comprises two electron discharge tubes T1 and T2. The cathodes 62 and 63 of tubes T1 and T2 respectively are joined and coupled to ground through cathode resistor 64. The anode 65 of tube T1 is supplied with positive potential through resistor 66, and the anode 67 of tube T2 is supplied with positive potential through resistor 68. The cathodes are also connected to the positive supply by means of wire 69 and resistor 71. Control grid 72 of tube T1 is connected to the anode 67 of tube T2 through a parallel combination of resistor 73 and capacitor 74, and wire 75. Control grid 76 of tube T2 connects to the parallel combination of resistor 77 and capacitor 78 and through wire 79 to anode 65 of tube T1. Pickup coil C1 in series with resistor 79 couple control grid 72 to ground. Pickup coil 72 in series with resistor 81 couple control grid 76 of tube 72 to ground. Anode 65 connects with cathodes 54 and 55 of amplifying tubes 52, 53 through wire 82, capacitor 83 and resistor 84. The junction of capacitor 83 and resistor 84 is connected to ground through diode 85.

Under normal scanning operation, T1 is conducting, T2 is nonconducting and amplifying tubes 52, 53 are permitted to amplify message signals scanned by the photocell. As the trailing edge 21*a* of a message sheet passes the scanning beam, magnetic flux from magnet M1 will cut coil C1 (Fig. 4) thereby applying a negative pulse to the grid 72 of tube T1. This pulse is amplified and inverted by T1 and applied to the control grid of T2 as a positive pulse through wire 79 and the parallel combination of resistor 77 and the capacitor 78 to bring T2 into the conducting region. As T2 commences conducting, the potential of its anode 67 is lowered thus applying a larger negative pulse to the grid of T1. This action is regenerative and results in tube T1 going off and T2 fully conducting. With T1 nonconducting, the potential of its anode 65 is now more positive which constitutes the initiation of a positive pulse to the cathodes 54, 55 of the amplifying tubes. Thus, the amplifier 48 is biased beyond cut off and message signals are prevented from being transmitted to the line. When the transmitter drum has rotated to the position illustrated in Fig. 5, magnet M2 induces a voltage in coil C2 which applies a negative pulse to control grid 76 of tube T2. This pulse is amplified, inverted and applied to the grid of T1 and a regenerative action commences similar to that described above which renders T1 fully conductive and T2 fully nonconductive. With tube T1 conducting, the potential of its anode 65 will decrease to extinguish the positive pulse applied to the cathodes of the amplifying tubes 52, 53. It is at this point that blanking ceases and normal transmission again commences. The function of diode 85 is to prevent transmission of negative overshoots which would tend to overdrive the amplifying tubes. The diode clamps these overshoots to ground.

It is sometimes desirable to transmit a blanking signal during the blanking period. For example, in transmitting a negative of the message copy, the scanning of white background causes a signal to be applied to the line. In order that the blanking area on the received copy appears as white background, it is necessary to apply a signal to the line corresponding to the signal produced by white background. In the present invention, an oscillator is provided the output of which is coupled to the line. The oscillator is tuned to produce a signal corresponding to the signal produced by the background of the message copy. The multivibrator 61 heretofore described selectively controls the energization of the oscillator so that blanking signals are applied to the line only during the blanking period.

The oscillator and its connections to the transmitter are shown in Fig. 6. Wires 86 and 87 connect the oscillator output to the outgoing line. Wire 88 connects the anode of tube T1 to the oscillator. As previously set forth, the condition of nonconduction of tube T1 effects blanking due to the increase of positive potential of anode 65. This same positive potential is also employed to energize the blanking oscillator which will remain energized only so long as the tube T1 is nonconducting which is the blanking period. A manually operated switch 89 is interposed in wire 88 to disconnect the oscillator when a blanking signal is not desired.

While the present invention has been disclosed with reference to a specific embodiment, it is of course understood that various changes and modifications may be made without departing from the scope of the invention as defined in the claims. It is immaterial to the present invention whether the transmitting drum is mounted vertically or horizontally, or whether the scanning mechanism scans the interior surface or the exterior surface of the drum. Also, the specific details of the wrapper fastening means forms no part of the present invention and any suitable or convenient fastening means may be employed.

What is claimed is:

1. A facsimile transmitter comprising a rotatable drum adapted to mount a message sheet wherein an underlap area is defined by the trailing and leading edges of said sheet, scanning means associated with said drum, an output circuit connected to said scanning means, blanking means connected to said output circuit, said blanking means comprising a bi-stable multivibrator operable to a first condition to permit message transmission and to a second condition to cause message blanking, means to effect the said first condition of the multivibrator as the leading edge of a message sheet enters the scanning area and means to effect the said second condition of the multivibrator as the trailing edge of the message sheet enters the scanning area.

2. A facsimile transmitter comprising a rotatable drum adapted to mount a message sheet wherein an underlap area is defined by the trailing and leading edges of said sheet, scanning means associated with said drum, an output circuit connected to said scanning means, blanking means connected to said output circuit, said blanking means comprising a bi-stable multivibrator operable to a first condition to permit message transmission and to a second condition to cause message blanking, voltage producing means to effect the said first condition of the multivibrator as the leading edge of a message sheet enters the scanning area and second voltage producing means to effect the said second condition of the multivibrator as the trailing edge of the message sheet enters the scanning area.

3. A facsimile transmitter comprising a rotatable drum adapted to mount a message sheet wherein an underlap area is defined by the trailing and leading edges of said sheet, scanning means associated with said drum, an output circuit connected to said scanning means, blanking means connected to said output circuit, said blanking means comprising a bi-stable multivibrator operable to a first condition to permit message transmission and to a second condition to cause message blanking, voltage producing means to effect the said first condition of the multivibrator as the leading edge of a message sheet enters the scanning area and second voltage producing means to effect the said second condition of the multivibrator as the trailing edge of the message sheet enters the scanning area, said first and said second voltage producing means being synchronized with the rotation of said drum.

4. Facsimile apparatus comprising a rotatable drum adapted to mount a message sheet, message analyzing means associated with said drum, transmission means coupled to said analyzing means, blanking means coupled to said transmission means to prevent message transmission for a predetermined interval during each rotation of said drum, said blanking means comprising first voltage generating means operable in synchronization with said drum to initiate the blanking interval, second voltage generating means operable in synchronization with the drum to terminate the blanking interval, each of said first and second voltage generating means comprising a stator and a rotor and a settable member mounted to be rotated independently of said drum to adjust the angular position of the rotor of said second voltage generating means with respect to the rotor of said first voltage generating means.

5. A facsimile transmitter comprising a rotatable drum adapted to mount a message sheet wherein an underlap area is defined by the trailing and leading edges thereof, scanning means associated with said drum, an output circuit connected to said scanning means, blanking means connected to said output circuit, said blanking means comprising a bistable trigger circuit operable to a first condition to permit message transmission and to a second condition to cause message blanking, means to effect the said first condition of the trigger circuit as the leading edge of a message sheet enters the scanning area, means to effect the said second condition of the trigger circuit as the trailing edge of the sheet enters the scanning area, each of said last two named means including electrical energy producing means operable in synchronism with said drum, each of said electrical energy producing means being adapted to periodically generate a voltage pulse, and signal means connected to each of said electrical energy producing means and to said output circuit to transmit a blanking signal during the blanking period, said signal means being selectively controlled by said voltage pulses.

References Cited in the file of this patent

UNITED STATES PATENTS

| | | |
|---|---|---|
| 2,600,868 | Hales | June 17, 1952 |
| 2,618,702 | Thompson | Nov. 18, 1952 |
| 2,635,032 | Shea | Apr. 14, 1953 |
| 2,718,548 | Jelinek | Sept. 20, 1955 |
| 2,741,661 | De France | Apr. 10, 1956 |